United States Patent [19]

Najjar et al.

[11] Patent Number: 5,139,540
[45] Date of Patent: Aug. 18, 1992

[54] MEMBRANE SEPARATION OF GASES

[75] Inventors: Mitri S. Najjar, Wappingers Falls; Uygur Kokturk, Poughkeepsie; Martin D. Hilmar, Beacon; Jeffrey C. Templeton, Cold Spring, all of N.Y.

[73] Assignee: Texaco Inc., White Plains, N.Y.

[21] Appl. No.: 734,994

[22] Filed: Jul. 24, 1991

[51] Int. Cl.$^5$ .................. B01D 53/22; B01D 71/02
[52] U.S. Cl. .......................... 55/16; 55/68; 55/158
[58] Field of Search .............. 55/16, 68, 158, 524

[56] References Cited

U.S. PATENT DOCUMENTS

| 2,627,933 | 2/1953 | Teter | 55/158 |
| 4,329,157 | 5/1982 | Dobo et al. | 55/158 X |
| 4,971,696 | 11/1990 | Abe et al. | 55/158 X |

FOREIGN PATENT DOCUMENTS

| 2550953 | 3/1985 | France | 55/158 |
| 53-99078 | 8/1978 | Japan | 55/16 |
| 59-55314 | 3/1984 | Japan | 55/158 |
| 59-59223 | 4/1984 | Japan | 55/158 |
| 59-59224 | 4/1984 | Japan | 55/158 |
| 59-98706 | 6/1984 | Japan | 55/158 |
| 59-102403 | 6/1984 | Japan | 55/158 |
| 59-107988 | 6/1984 | Japan | 55/158 |
| 59-147605 | 8/1984 | Japan | 55/158 |
| 59-150508 | 8/1984 | Japan | 55/158 |
| 59-179112 | 10/1984 | Japan | 55/158 |
| 61-209005 | 9/1986 | Japan | 55/158 |
| 61-238303 | 10/1986 | Japan | 55/158 |
| 63-49220 | 3/1988 | Japan | 55/158 |
| 1-281119 | 11/1989 | Japan | 55/158 |
| 1-310714 | 12/1989 | Japan | 55/158 |
| 0604826 | 9/1978 | Switzerland | 55/16 |

OTHER PUBLICATIONS

L. L. Hench & J. K. West, "The Sol-Gel Process", Chem. Rev. (1990), 90, 33–72.

Primary Examiner—Robert Spitzer
Attorney, Agent, or Firm—Robert A. Kulason; James J. O'Loughlin; Carl G. Seutter

[57] ABSTRACT

Mixture of gases such as hydrogen/carbon dioxide may be separated by use of membrane formed by reaction of an aluminium alkoxide with water vapor at high temperatures and pressures.

14 Claims, No Drawings

MEMBRANE SEPARATION OF GASES

FIELD OF THE INVENTION

This invention relates to novel membranes and to the method of preparation of these membranes. More particularly it relates to a method of separating charge mixtures which contain several components to permit attainment of product stream which is enriched with or depleted of one of the components.

BACKGROUND OF THE INVENTION

As is well known to those skilled in the art, it is possible to treat charge mixtures by various techniques in order to recover one (or more) components in enriched or in pure form. In the case of liquids, this may commonly be effected by distillation or adsorption. In the case of gases, it is possible to effect separation by absorption or adsorption or by distillation of the liquified gases.

Although prior art attempts to separate gases, such as mixtures of hydrogen and carbon dioxide, by use of membrane technology have been heretofore considered, they have not been successful for many reasons. Among these may be noted the failure of the membranes due to mechanical defects (e.g. cracking) or the attainment of undesirably low Separation Factors and/or Flux.

It has also been difficult-to-impossible to fabricate membranes to be used in these processes because the fabrication processes were slow, difficult to control, produced unsatisfactory membranes, or required undesirable reagents (e.g. large quantities of water).

Background relating to this invention may be obtained from the article *The Sol-Gel Process* by Larry L. Hench and Jon K. West Chem Rev (1990) 90 33-72.

It is an object of this invention to provide a method of forming a membrane of an oxide of aluminum characterized by its ability, when formed as a membrane, to separate components of charge streams. Other objects will be apparent to those skilled in the art.

STATEMENT OF THE INVENTION

In accordance with certain of its aspects, this invention is directed to a method of forming a membrane of an oxide of aluminum which comprises
forming a mixture of an aluminum alkoxide, water, and acid peptizing agent, characterized by a mole ratio of water: alkoxide of 0.05-0.9:1;
maintaining said mixture at temperature of 40° C.-95° C. for 0.5-16 hours whereby 2-80 mole % of said alkoxide is hydrolyzed to form a peptized partially hydrolyzed mixture containing high purity alumina containing aluminum-oxygen repeating units and bearing alkoxide groups;
contacting the partially hydrolyzed mixture with water-vapor at 100° C.-300° C. and pressure of 5-300 psig thereby forming a completely hydrolyzed sol containing high purity alumina;
depositing said peptized partially hydrolyzed mixture containing high purity alumina containing aluminum-oxygen repeating units and bearing alkoxide terminal groups on a support thereby forming a high purity alumina membrane on said support; and
recovering said high purity alumina membrane on said support.

DESCRIPTION OF THE INVENTION

The substrate or support which may be used in practice of the process of this invention may be a permeable composition which is stable under the conditions of preparation and operation. The preferred substrates may be formed of alumina, silica, silica-alumina, zirconia, silica-zirconia, alumina-zirconia, silica-titania, alumina-titania, carbon, zeolite, mullite, cordenite, porous metals such as stainless steel, silver etc. The preferred ceramic permeable support may be alumina, preferably alpha alumina, in the form of a disk or plate, a cylinder or tube, etc.

The membrane layers of this invention may be formed on the support by use of a charge composition of aluminum alkoxide. Although it may be possible to prepare the novel membranes of this invention from a mono-alkoxide $Al(OR)X_2$ (wherein X represents another inert group) or from a dialkoxide $Al(OR)_2X$, it is preferred to utilize, as charge, a tri-alkoxide characterized by the formula $Al(OR)_3$.

In the above formula, R may be a hydrocarbon group selected from the group consisting of alkyl, aralkyl, cycloalkyl, aryl, and alkaryl including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloakyl, ether, etc. Typically inertly substituted R groups may include 2-ethoxyethyl, carboethoxymethyl, 4-methylcyclohexyl, etc. The preferred R groups may be lower alkyl, i.e. $C_1-C_{10}$ alkyl, groups including e.g. methyl, ethyl, n-propyl, i-propyl, butyls, amyls, hexyls, octyls, decyls, etc. R may preferably be isopropyl or sec-butyl.

The preferred aluminum alkoxides are those lower aluminum alkoxides wherein all the R groups are the same. Most preferred are aluminum tri-sec-butoxide and aluminum tri-isopropoxide. It is preferred to utilize the lower alkoxides because they are generally liquids at temperature of operation and for economic reasons (i.e. they contain a larger relative content of aluminum). Aluminum alkoxides are readily available commercially from various suppliers including Aldrich, Fisher, or Johnson Matthey.

In practice of the process of this invention, the charge $Al(OR)_3$ (referred to as an alkoxide, for convenience) is employed in liquid state. In the case of the higher alkoxides (typified by aluminum tri-decyloxide) which are solid at operating temperature, they may be employed in admixture with an alcohol, preferably ROH i.e. wherein the R group is preferably the same as that of the alkoxide. Mixtures of alkoxides may be employed.

To the charge alkoxide (100 parts) at temperature of 45° C.-95° C., say 85° C., there are added 0.1-5 parts, say 3 parts of acid peptizing agent and 10-250 parts, say 75 parts of liquid alcohol, typically a lower $C_1-C_3$ alkanol such as isopropanol. Typical peptizing agents may include nitric acid, oxalic acid, acetic acid, or sulfuric acid. The preferred peptizing agent may be nitric acid.

There is also added to the charge mixture of alkoxide and peptizing agent, water in amount sufficient to yield a mole ratio of water: alkoxide of 0.05–0.9:1, preferably 0.2–0.6:1, say 0.4:1. The deficiency of water permits reaction to be carried out to partially hydrolyze the alkoxide.

Partial hydrolysis is typically carried out at 40° C.–95° C., say 62° C. and 0–20 psig, say 10 psig for 2–18 hours, say 8 hours.

During reaction over 2–8 hours, say 6 hours. The aluminum alkoxide is partially decomposed to yield alcohol and alkoxide in which some of the alkoxide groups have been replaced by —OH groups:

$$Al(OR)_3 + H_2O \rightarrow Al(OR)_2OH + ROH.$$

The partially hydrolyzed sol is then contacted (with or without alcohol) with water vapor to effect complete hydrolysis typically at 100° C.–300° C., say 175° C. and 5–300 psig, say 15 psig for 1–10, say 3 minutes.

The above reaction proceeds further to yield hydrolyzed polymerized product $$n\ Al(OR)_2OH + H_2O\ (g) \rightarrow n-2\ ROH + RO(Al-O)_{n-1}Al-OR$$

wherein n is 20–15,000,000, say 20,000.

Prior to formation of the alumina membrane on a support, it is desirable to prewet the support as with an alcohol ROH, preferably methanol or ethanol.

Preparation of an alumina membrane assembly from the stabilized sol may be effected by various techniques. If it be desired to coat e.g. the inside of a tubular or cylindrical microporous support, the sol in liquid phase may be steam sprayed through the tubular or cylindrical support to form thereon a membrane of alumina over 0.5–30, say 3 minutes at 100° C.–220° C., say 125° C.

Preparation of an alumina membrane from the stabilized sol may be effected by various techniques. If it be desired to coat e.g. the inside of a tubular or cylindrical microporous support, the sol in liquid phase may be steam sprayed through the tubular or cylindrical support to form thereon a membrane of alumina. In another embodiment, the stabilized sol liquid may be poured as a thin layer on a flat surface. In either case, excess liquid (e.g. water or alcohol) may be removed by drying at 15° C.–80° C., say 40° C. for 6–28 hours, say 18 hours followed by calcining at 250° C.–500° C., say 400° C. for 16–48 hours, say 34 hours.

Supported alumina membranes may be formed by contacting a thin microporous support (formed typically of alpha alumina, silica, or porous silver) with the sol to attain a thin film on the surface thereof. This film-membrane may be dried at 250° C.–500° C., say 400° C. for 16–48 hours, say 34 hours.

In any of these embodiments, the sol-generated membrane may be formed on an intermediate layer (or layers) on the support. For example, it may be desirable to have a microporous support of alpha alumina, bearing (i) an intermediate layer of aluminum oxide (formed thereon e.g. by contact with an aqueous sol of gamma alumina which is dried at 20° C.–70° C., say 45° C. for 2–18 hours, say 14 hours followed by calcining at 250° C.–400° C., say 350° C. for 4–48 hours, say 24 hours) and (ii) a separating membrane layer of this invention.

The separating membrane layer of this invention so prepared is characterized by a thickness of 0.3–20 microns, say 7 microns. When the intermediate layer is present, it may be characterized by a thickness of 5–200 microns, say 20 microns.

The membranes prepared by the process of this invention are typically characterized as follows:

TABLE

| Property | Broad | Preferred |
|---|---|---|
| Surface Area by | | |
| Cumulative Desorption m²/g | 4–400 | 305 |
| Multi-point BET m²/g | 2–400 | 210 |
| Pore Volume cc/g for | | |
| Pores <1857.2A at P/Po = 0.005 | 3.5–80 | 31 |
| Cumulative Desorption 300A–12.5A radius | 2–100 | 22 |
| Porosity % | 30–70 | 47 |
| Pore Size | | |
| Average Pore Diameter A | 3–40 | 25.6 |
| <100Å % | 99.5–100 | 99.95 |

The Permeability (mol/cm²sec cm) of the product membranes may range from 200 up to about 1000 for typical gases—and Separation Factor may be 2–7.8. Illustrative Permeabilities may be as follows:

TABLE

| Gas | Permeability | |
|---|---|---|
| | 5 psi | 10 psi |
| Hydrogen | 799 | 897 |
| Nitrogen | 303 | 335 |
| Carbon Monoxide | 299 | 323 |
| Carbon Dioxide | 272 | 293 |

It is a particular feature of the alumina membranes of this invention that they are characterized by desirably smaller pore size than membranes prepared in the presence of an excess of water. Control membranes prepared by the Sol-Gel Process formed using a mole ratio of water: alkoxide greater than are undesirably characterized by average pore diameter which is undesirably high (typically greater than 40A), and by an undesirably wide pore size distribution, with non-uniform pore structure (typically 80%–97%, say 87% below 100A, 0.3%–2%, say at 100A–500A, 0.2%–1.5%, say 0.8% at 500–1000A.

In contrast, the alumina of the membranes of the invention may be characterized by an average Pore Diameter which is low (typically less than about 40A, commonly 3–27A say 8A), and a desirably narrow Pore Size Distribution with uniform pore structure (typically about 99.5%–100%, say 99.95% below 100A, 0%–0.5%, say 0.05% at 100–500A.

In accordance with certain of its aspects, this invention is directed to a method of separating a charge gas mixture containing a more permeable gas and a less permeable gas which comprises passing a charge gas mixture containing a more permeable gas and a less permeable gas into contact with a membrane of a high purity alumina containing aluminum-oxygen repeating units and bearing alkoxide groups said membrane being characterized by a narrow pore size distribution wherein the average Pore Diameter is less than about 40 Å and the Pore Size Distribution is such that at least about 99.95% of the pores have a diameter below 100A;

maintaining a pressure on the charge side of said membrane greater than the pressure on the permeate side of said membrane thereby yielding a permeate containing increased quantity of said more permeable gas and decreased quantity of said less permeable gas and a retentate containing decreased quantity of said more permeable gas and an increased quantity of said less permeable gas;

recovering said permeate containing increased quantity of said more permeable gas and decreased quantity of said less permeable gas; and recovering said retentate containing decreased quantity of said more permeable gas and an increased quantity of said less permeable gas.

The separations membranes prepared by the process of this invention, whether on a supporting membrane or other structure are particularly characterized by their ability to separate charge gas streams into their several components. For example, it is possible to treat gas streams containing various combinations of gases such as hydrogen, nitrogen, carbon monoxide, carbon dioxide, ammonia, hydrogen sulfide, hydrocarbons, inert gases, etc. to yield a product which is desirably enriched (or depleted) in one of the components. Typical systems which may be treated include hydrogen/carbon dioxide, hydrogen/nitrogen, nitrogen/carbon dioxide, etc. It is preferred that the charge stream be dry i.e. that it contain less than 100 ppm of water and that it be free of strongly acid gases such as hydrogen chloride i.e. less than 1 ppm.

Separation of the charge gas may be effected by passing the charge gas at 15° C.–600° C., say 200° C. and 1–200 psig, say 200 psig into contact with the membrane at a flow rate of 10–125 moles sec, say 68 moles sec.

During operation, charge containing say hydrogen (35v %) and carbon dioxide (65v %) may yield permeate containing 95v % hydrogen and 8v % carbon dioxide—corresponding to a Flux of 200–1800, say 825, and a Separation Factor of 4.6–7.8, say about 5.3. Satisfactory commercial operation typically is attained with a Separation Factor of about 5.

ADVANTAGES OF THE INVENTION

Among the advantages of this invention may be noted the following:

1. It permits preparation and application of a charge sol in a matter of minutes.
2. Membrane generation is effected in the presence of minimum amount of added water—so that this need not be removed during treatment (removal of any substantial quantity of water would tend to crack the membranes).
3. The formed membrane can be used at high or low temperature with little or no evidence of cracking or other deterioration.
4. Charge mixtures can readily be separated at high Flux, Selectivity, and Separation Factor.
5. The formed membranes have a narrow pore size distribution. Typically >90% of the pores are <40A diameter.
6. The formed membranes have a relatively large surface area.

DESCRIPTION OF PREFERRED EMBODIMENTS

Practice of the process of this invention may be apparent to those skilled in the art from the following wherein all parts are parts by weight unless otherwise indicated. An asterisk indicates a control example.

EXAMPLE I

In this example which sets forth the best mode presently known of carrying out the process of this invention, the substrate on which the alumina is to be deposited is a tube of gamma alumina of 10 mm diameter, 1.5 mm thickness, and 750 mm length (as manufactured by Alcoa under the trademark Membralox).

The sol is prepared by mixing 100 parts of aluminum tri-isopropoxide with 3.2 parts of nitric acid peptizer and 63 parts of water. Water is added so that the mole ratio of water: aluminum tri-isopropoxide is 0.48.

Partial hydrolysis is carried out by maintaining the mixture at 62° C./10 psig for 8 hours. During hydrolysis, the aluminium alkoxide is converted to aluminum hydroxide and then to aluminum oxide.

Hydrolysis is completed by contacting the partially hydrolyzed solution with water vapor at 195° C. and 15 psig for 3 minutes.

The hydrolyzed stabilized sol is passed into contact with the inside of the tube wherein it is maintained for 3 minutes at 125° C. The liquid is gently poured off and the tube is heated (ca 10° C./hr) to 400° C. at which temperature it is maintained for 34 hours.

The product membrane (7 microns thick) is characterized as follows:

TABLE

| Property | Value |
|---|---|
| Porosity % | 47 |
| BET Surface $m^2/g$ | 210 |
| Pore Diameter Å | 25.6 |

The so-prepared membrane system is cooled to room temperature and inspected. There is then admitted to the interior of the tube at 100° C. and 10 psig charge gas containing 30v % hydrogen and 70v % carbon dioxide. After 2 hours operation, it is found that a permeate gas is recovered containing 87v % hydrogen and 13v % carbon dioxide.

This corresponds to a Separation Factor of 5.6 and a Flux of 1325 moles/sec. $cm^2$

EXAMPLES II–VIII

Results comparable to those obtained with Example I may be attained if the charge gas is (in 50v/50v) mixtures):

| | | Separation Factor at Charge Pressure | |
|---|---|---|---|
| Example | Gas | 10 psig | 5 psig |
| I | $H_2/CO_2$ | 5.6 | |
| II | $H_2/CO_2$ | | 5.3 |
| III | $H_2/CO_2$ | 5.5 | |
| IV | $H_2/CO_2$ | | 5.4 |
| V | $H_2/N_2$ | 4.7 | |
| VI | $H_2/N_2$ | | 4.6 |
| VII | $N_2/CO_2$ | 1.8 | 1.6 |
| VIII | $N_2/CO_2$ | | |
| IX | $H_2/He$ | 4.4 | |
| X | $H_2/He$ | | 4.3 |

Although this invention has been illustrated by reference to specific embodiments, it will be apparent to those skilled in the art that various charges and modifications may be made which clearly fall within the scope of the invention.

What is claimed is:

1. The method of separating a charge gas mixture containing a more permeable gas and a less permeable gas which comprises:

passing a charge gas mixture containing a more permeable gas and a less permeable gas into contact with the charge side of a membrane of a high purity alumina containing aluminum-oxygen repeating units and bearing alkoxide groups, said membrane being characterized by a narrow pore size distribution wherein the average Pore Diameter is less than about 40 Å and the Pore Size Distribution is such that at least about 99.5% of the pores have a diameter below 100A;

maintaining a pressure on the charge side of said membrane greater than the pressure on the permeate side of said membrane thereby yielding a permeate containing increased quantity of said more permeable gas and decreased quantity of said less permeable gas and a retentate containing decreased quantity of said more permeable gas and an increased quantity of said less permeable gas;

recovering from the permeate side of said membrane said permeate containing increased quantity of said more permeable gas and decreased quantity of said less permeable gas; and recovering said retentate containing decreased quantity of said less permeable gas.

2. A membrane comprising a high purity alumina containing aluminum-oxygen repeating units and bearing alkoxide groups and characterized by a narrow pore size distribution wherein the average Pore Diameter is less than about 40 Å and the Pore Size Distribution is such that at least about 99.5% of the pores have a diameter below 100A.

3. A membrane comprising a high purity alumina containing aluminum-oxygen repeating units and bearing alkoxide groups and characterized by a narrow pore size distribution wherein the average Pore Diameter is less than about 40 Å and the Pore Size Distribution is such that at least about 99.5% of the pores have a diameter below 100A prepared by the method which comprises forming a mixture of an aluminum alkoxide, water, and acid peptizing agent, characterized by a mole ratio of water: alkoxide of 0.05–0.9:1;

maintaining said mixture at temperature of 40° C.–95° C. for 2–18 hours whereby 2–80 mole % of hydrolyzed to form a peptized partially hydrolyzed mixture containing high purity alumina containing aluminum-oxygen repeating units and bearing alkoxide groups;

contacting the partially hydrolyzed mixture with water vapor at 100° C.–300° C. and 5–300 psig thereby forming a completely hydrolyzed sol containing high purity alumina;

depositing said completely hydrolyzed sol containing high purity alumina containing aluminum-oxygen repeating units and bearing alkoxide groups on a support thereby forming a high purity alumina membrane on said support; and recovering said high purity alumina membrane on said support.

4. The method of forming a membrane of an oxide of aluminum which comprises forming a mixture of an aluminum alkoxide, water, and acid peptizing agent, characterized by a mole ratio of water: alkoxide of 0.05–0.9:1;

maintaining said mixture at temperature of 40° C.–95° C. for 2–18 hours whereby 2–80 mole % of said alkoxide is hydrolyzed to form a peptized partially hydrolyzed mixture containing high purity alumina containing aluminum-oxygen repeating units and bearing alkoxide groups;

contacting the partially hydrolyzed mixture with water vapor at elevated contacting temperature of 100° C.–300° C. and 5–300 psig thereby forming a completely hydrolyzed sol containing high purity alumina;

depositing said completely hydrolyzed sol containing high purity alumina containing aluminum-oxygen repeating units and bearing alkoxide groups on a support thereby forming a high purity alumina membrane on said support; and recovering said high purity alumina membrane on said support.

5. The method of forming a membrane of an oxide of aluminum as claimed in claim 4 wherein said aluminum alkoxide is $Al(OR)_3$ wherein R is an alkyl, aralkyl, cycloalkyl, aryl, or alkaryl hydrocarbon.

6. The method of forming a membrane of an oxide of aluminum as claimed in claim 4 wherein said aluminum alkoxide is $Al(OR)_3$ wherein R is a lower alkyl.

7. The method of forming a membrane of an oxide of aluminum as claimed in claim 4 wherein said aluminum alkoxide is aluminum tri-isopropoxide.

8. The method of forming a membrane of an oxide of aluminum as claimed in claim 4 wherein said aluminum alkoxide is aluminum tri-sec-butoxide.

9. The method of forming a membrane of an oxide of aluminum as claimed in claim 4 wherein said peptizing agent is nitric acid, oxalic acid, acetic acid, or sulfuric acid.

10. The method of forming a membrane of an oxide of aluminum as claimed in claim 4 wherein said peptizing agent is nitric acid.

11. The method of forming a membrane of an oxide of aluminum as claimed in claim 4 wherein said elevated contacting temperature is 100° C.–300° C. at a pressure of 5–300 psig after 1–10 minutes.

12. The method of forming a membrane, of an oxide of aluminum as claimed in claim 4 wherein said high purity alumina contains residual alkoxide.

13. The method of forming a membrane of an oxide of aluminum as claimed in claim 4 wherein said support is an alumina support.

14. The method of forming a membrane of an oxide of aluminum which comprises forming a mixture of aluminum tri-isopropoxide or aluminum tri-sec-butoxide as aluminum tri-alkoxide, water, and nitric acid peptizing agent characterized by a mole ratio of water: alkoxide of 0.2–0.6:1;

maintaining said mixture at temperature of 40° C.–95° C. for 2–18 hours thereby forming a peptized partially hydrolyzed mixture containing aluminum-oxygen repeating units and bearing alkoxide groups;

contacting the partially hydrolyzed mixture with water vapor at 100° C.–300° C. and 5–300 psig thereby forming a completely hydrolyzed sol containing high purity alumina;

depositing said completely hydrolyzed sol containing high purity alumina containing aluminum-oxygen repeating units and bearing alkoxidede groups on a support thereby forming a high purity alumina membrane on said support; and recovering said high purity alumina membrane on said support.

* * * * *